United States Patent
Xoy et al.

(10) Patent No.: US 10,654,637 B2
(45) Date of Patent: May 19, 2020

(54) EXPANDABLE SECONDARY PACKAGE FOR A CONTAINER

(71) Applicant: Colgate-Palmolive Company, New York, NY (US)

(72) Inventors: Oscar Xoy, New Brunswick, NJ (US); Scott Demarest, Basking Ridge, NJ (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 15/848,980

(22) Filed: Dec. 20, 2017

(65) Prior Publication Data

US 2019/0185241 A1 Jun. 20, 2019

(51) Int. Cl.
| | |
|---|---|
| *B65D 81/05* | (2006.01) |
| *B65D 5/60* | (2006.01) |
| *B29C 65/00* | (2006.01) |
| *B65D 33/22* | (2006.01) |
| *B65D 81/03* | (2006.01) |
| *B31B 170/20* | (2017.01) |

(52) U.S. Cl.
CPC .......... *B65D 81/052* (2013.01); *B29C 66/727* (2013.01); *B29C 66/72328* (2013.01); *B29C 66/72343* (2013.01); *B65D 5/606* (2013.01); *B65D 33/22* (2013.01); *B65D 81/03* (2013.01); *B31B 2170/20* (2017.08); *B32B 2553/02* (2013.01)

(58) Field of Classification Search
CPC .... B65D 81/052; B65D 5/606; B65D 81/051; B65D 81/05

USPC .............................. 206/522, 523, 524; 383/3
See application file for complete search history.

(56) References Cited

U.S. PATENT DOCUMENTS

| | | | | |
|---|---|---|---|---|
| 3,412,521 | A * | 11/1968 | Bauman | B65B 55/20 53/474 |
| 3,871,521 | A * | 3/1975 | Szatkowski | B65D 81/113 206/524 |
| 4,087,002 | A | 5/1978 | Bambara et al. | |
| 4,155,453 | A * | 5/1979 | Ono | B65D 81/052 206/522 |

(Continued)

FOREIGN PATENT DOCUMENTS

| | | |
|---|---|---|
| EP | 0586232 | 2/1995 |
| GB | 838205 | 6/1960 |

OTHER PUBLICATIONS

International Search Report and the Written Opinion of the International Searching Authority issued in international application PCT/US2018/065448 dated Feb. 25, 2019.

*Primary Examiner* — Steven A. Reynolds

(57) ABSTRACT

A container comprised a container body having a first cavity for receiving a product therein, the container body having a front surface, back surface, first sidewall and second sidewall, and a cover having an opening extending thereinto, said opening configured to receive said container body therein, the cover comprising an outer wall, an inner wall and a second cavity defined between said outer wall and inner wall, said second cavity housing a protective material therein. The protective material moves the cover from a first configuration defining a first inner profile of the inner wall of the cover to a second configuration defining a second inner profile of the cover, said second inner profile being smaller than the first inner profile.

16 Claims, 2 Drawing Sheets

(56) References Cited

U.S. PATENT DOCUMENTS

| | | | | |
|---|---|---|---|---|
| 4,240,556 A * | 12/1980 | Field | ................ | B65D 81/03 |
| | | | | 206/522 |
| 4,620,633 A * | 11/1986 | Lookholder | .......... | B29C 44/185 |
| | | | | 206/523 |
| 4,918,904 A * | 4/1990 | Pharo | ................ | B65D 81/03 |
| | | | | 493/931 |
| 5,129,519 A * | 7/1992 | David | ................ | B65D 81/1075 |
| | | | | 206/523 |
| 5,180,060 A * | 1/1993 | Forti | ................ | B65D 81/052 |
| | | | | 206/522 |
| 5,372,429 A | 12/1994 | Beaver, Jr. et al. | | |
| 5,402,892 A * | 4/1995 | Jaszai | ................ | A61F 5/05816 |
| | | | | 137/223 |
| 5,547,075 A * | 8/1996 | Hoogerwoord | ........ | B65D 81/03 |
| | | | | 206/204 |
| 6,139,188 A * | 10/2000 | Marzano | ............ | B65D 81/3888 |
| | | | | 206/522 |
| 6,520,333 B1 * | 2/2003 | Tschantz | ............ | B65D 81/052 |
| | | | | 206/522 |
| 6,755,568 B2 | 6/2004 | Malone et al. | | |
| 7,585,528 B2 | 9/2009 | Ferri et al. | | |
| 9,174,787 B2 * | 11/2015 | Scarbrough | .......... | A45C 7/0081 |
| 9,700,161 B2 | 7/2017 | Yoshifusa et al. | | |
| 9,980,609 B2 * | 5/2018 | De Lesseux | ........ | B65D 81/389 |
| 2006/0108256 A1 | 5/2006 | Bussey, III et al. | | |
| 2006/0201960 A1 | 9/2006 | Frayne | | |
| 2010/0282824 A1 | 11/2010 | Kannankeril et al. | | |

* cited by examiner

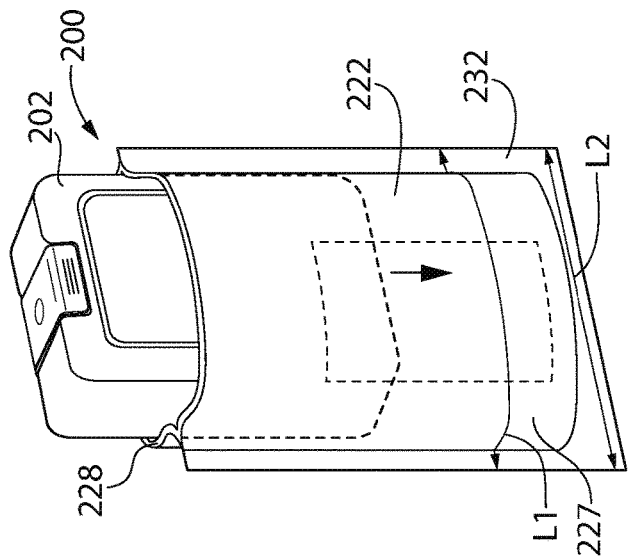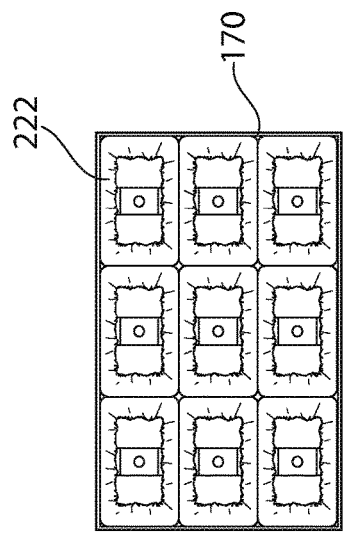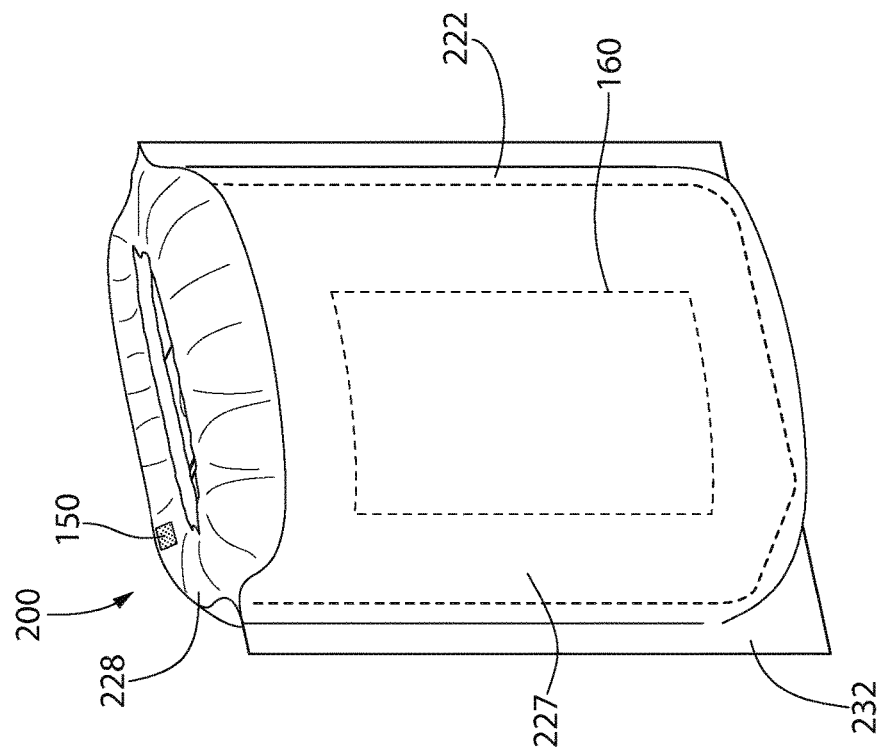

EXPANDABLE SECONDARY PACKAGE FOR A CONTAINER

FIELD OF THE INVENTION

The present invention relates generally to the field of packaging, and specifically to protective packaged containers used to dispense a fluid or gel.

BACKGROUND OF THE INVENTION

Various containers are known in the art for the retention and exhibition of fluids or gels such as cleaning products, fabric softeners or oral care products. Such containers are typically formed with a primary packaging having a shape and size selected to minimize weight and/or outer profile so as to maximize the quantity of containers receivable in a shipping carton. However, this primary packaging sacrifices structural integrity for other factors such as weight, size and aesthetics. Thus, in order to ship said container, the container must be provided with a cumbersome secondary or tertiary packaging to protect the container during transport. In some cases, the primary packaging is loaded into a shipping carton (secondary packaging) and the shipping carton is provided with a means to prevent further damage to the container during transport (tertiary packaging). For example, a cushioning material (e.g., loose-fill styrofoam packing material or "packing peanuts", air filled sacs, etc.) is inserted into the shipping carton to limit movement of the container within the shipping carton during transport (e.g., for e-commerce). However, these packaging systems are cumbersome and require the addition of additional packaging materials at various stages of transport, therefore increasing the manpower needed to transport goods to a consumer, creating extra steps to be completed by the shipper and any intermediary parties (e.g., third-party seller], and increasing the overall cost of shipping the container. Furthermore, the secondary packaging (e.g., loose-fill styrofoam packing material or "packing peanuts", air-filled sacs, etc.) is often incapable of withstanding forces applied thereto during shipping and thus fails to properly insulate the container stored therein from fracture, leakage and other damage.

There is a need for a container which is configured to withstand forced applied thereto during transport while minimizing the steps required to ship said container.

BRIEF SUMMARY

The present invention describes a container comprising a container body having a first cavity for receiving a product therein, the container body having a front surface, back surface, first sidewall and second sidewall, and a cover having an opening extending thereinto, said opening configured to receive said container body therein, the cover comprising an outer wall, an inner wall and a second cavity defined between said outer wall and inner wall, said second cavity housing a protective material therein. The protective material moves the cover from a first configuration defining a first inner profile of the inner wall of the cover to a second configuration defining a second inner profile of the inner wall of the cover, said second inner profile being smaller than the first inner profile.

The present invention also describes a container comprising a cover having an opening extending thereinto, said opening configured to receive a container body therein, the cover comprising an outer wall, an inner wall and a second cavity defined between said outer wall and inner wall, said second cavity housing an absorbent material therein, and a permeable region provided on the inner wall of the cover, said permeable region being open to the second cavity.

The present invention also describes an insert for a shipping container, comprising an insert body having an opening extending thereinto, said opening configured to receive a container body therein, the insert body comprising an outer wall, an inner wall and a second cavity defined between said outer wall and inner wall, said second cavity housing a protective material therein, wherein said protective material is movable from a first configuration defining a first outer profile of the insert body and a second configuration defining a second outer profile of the insert body, said second outer profile being larger than the first outer profile. The protective material may be expandable and/or absorbent. The insert may further comprise a permeable region provided on the inner wall of the insert body, said permeable region being open to the protective material.

BRIEF DESCRIPTION OF THE DRAWINGS

The features of the exemplified embodiments will be described with reference to the following drawings in which like elements are labeled similarly. The present invention will become more fully understood from the detailed description and the accompanying drawings, wherein:

FIG. 2A is a front perspective view of a container according to one embodiment of the present invention;

FIG. 2B is another front perspective view of the containers of FIG. 2B; and

FIG. 2C is a perspective view depicting a plurality of the containers of FIG. 2C loaded in a secondary container.

DETAILED DESCRIPTION

Figure 1B:
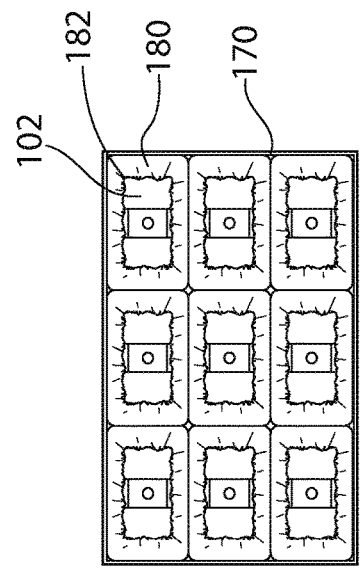
FIG. 1B Is another front perspective view of the containers of FIG. 1A.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected", and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Exemplary embodiments of the present invention will now be described with respect to a packaging system for a fluid or fluid-like material including, but not limited to a cleaning product, water solution, skin-care product, a hair care product and/or oral care product. However, other embodiments of the present invention may be used to store and dispense any suitable type of fluid and the invention is expressly not limited to any particular fluidic material alone.

A container according to the present invention is provided with a protective cover removably receivable thereover to cover or envelope at least a portion of the container. Specifically, the protective cover is formed as a sleeve, bag or envelope having a cavity configured to receive the container therein. The combination of the container and the protective cover is configured to permit transport of the container without the need for tertiary packaging. Whereas conventional containers (e.g., containers housing oral care products such as toothpaste or mouthwash; containers housing home care products such as detergent, softener, cleaning solution, dish soap; etc.) must be packaged within a shipping carton including a loose-fill cushioning material therein to prevent breaks and/or leakage during transport, the containers described herein are configured to optionally permit shipping without the use of loose-fill materials. The containers described herein are designed to be capable of withstanding forces from dropping, radial compression (e.g., when loaded in a delivery vehicle with other packages), etc. In particular, the containers described herein are provided with features configured to absorb and insulate the interior of the container from external forces. Any of the protective features described herein may be formed integral to the container or may be removably attached thereto. Further, any of the containers described herein may be provided with any combination of the protective features described herein. The exemplary container described herein may be shipped within the protective cover by itself or with any plurality of additional containers. Further, the exemplary container may also be shipped to a brick and mortar retail store and sold with the exemplary protective cover provided thereon. In particular, the exemplary container described herein is especially advantageous in the e-commerce space and permits the safe transport of one or more containers while minimizing damage thereto and reducing the cost of shipping said container.

The containers described herein may be provided with protective covers which are one of permanently and removably attached thereto. For example, the container may be fitted with the protective cover during a manufacturing step. The container described herein may be formed via a conventional means known in the art including, but not limited to, injection stretch blow molding, extrusion blow molding, etc., as those of skill in the art will understand. The container may then be filled with a fluid or fluid-like material and inserted into a protective cover, the container being locked within the protective cover via one or more of an adhesive, welding, a mechanical attachment (e.g., tongue and groove, snap-fit, friction-fit, keyed fit, etc.), a flap extending from the cover and over the upper surface of the container body 102, or any other method of attachment known to those of skill in the art. Any of the container bodies described herein may be modified to include one or more of the protective covers described herein to provide added strength to specific portions of the container body. Further, various features of the containers described herein may be combined with one another without deviating from the scope of the invention. As a non-limiting example, the shape of the container body may be substantially rectangular, frusto-conical, cylindrical, elliptical, or any other shape. Further, any of the container bodies may be modified to include a recessed lid or a necked lid.

The protective covers described herein may be formed of one or more of polyolefins (polypropylenes; low, medium and high density polyethylenes which may be formed via extrusion blow molding; and any combination of the above), polyethylene terephthalate ("PET") (made via injection stretch blow molding), elastomeric materials, extruded resins, rubbers, molded or extruded cellulose (e.g., paper pulp), metallic film, and multi-layer extruded film.

Figure 1C:
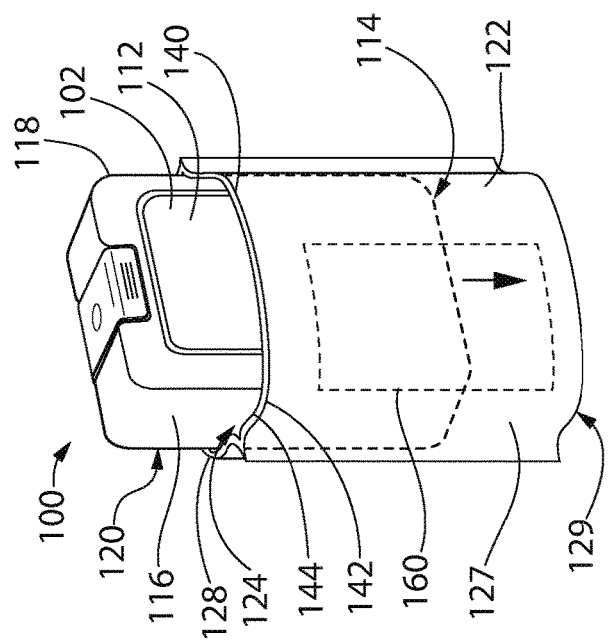
FIG. 1C is a perspective view depicting a shipping container having an insert receiving a plurality of container bodies therein.
Figure 1A:
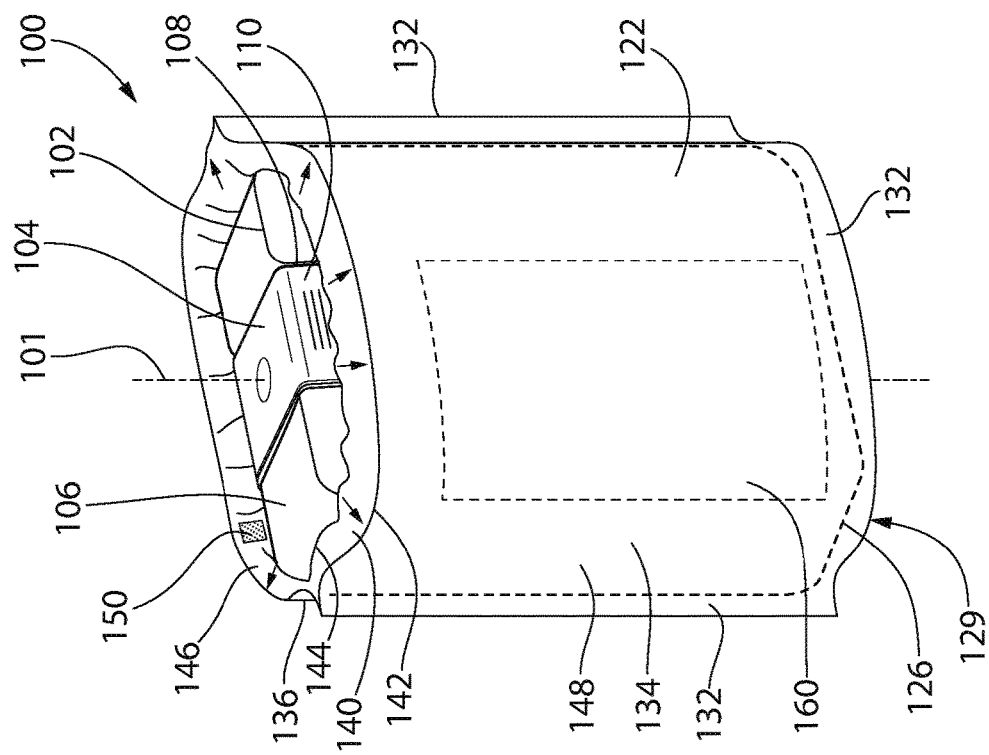
FIG. 1A Is a front perspective view of a container according to one embodiment of the present invention.

FIGS. 1A-1B depict a container 100 for the storage of a fluidic material. The container comprises a unitary container body 102 formed of a polymer or carton (e.g., tetrapack material), and extending along a longitudinal axis 101. A lid 104 is provided on an upper surface 106 of the container 100, the lid 104 selectively sealing an opening formed in said upper surface 106 to provide access to the contents of the container. In a preferred embodiment, the lid 104 is coupled to the container 100 by a hinge mechanism, wherein the hinge may be integrally formed with the lid. The lid 104 may alternatively be separable from the container 100. In a preferred embodiment, the container body 102 is substantially rectangular and comprises rounded edges to minimize damage thereto when impacted. This shape further facilitates case packing and is robust enough to minimize the need for secondary packaging. The upper surface 106 further comprises a recessed portion 108 adjacent the opening. The recessed neck of the container body 102 further comprises a retention ring (not shown) which engages a corresponding retention ring on the lid 104. The recessed portion 108 is longitudinally offset from the upper surface 106 by a predetermined depth selected so that, when the lid 104 is positioned thereover, the lid 104 lies flush with or below the upper surface 106. This configuration reduces forces applied to the lid during transport and therefore reduces the risk of the lid becoming accidentally detached from the container. The lid 104 further comprises a protrusion or tab 110 provided on a gripping surface thereof to enhance the ability of a user to grip and open the lid 104. The lid 104 may alternatively be coupled to the container 100 by a screw engagement, friction-fit or another attachment means known in the art. An additional securement may optionally be provided over the lid 104 (e.g., removable sealing mechanism such as a sticker, etc.). At least an outer portion of the lid 104 is rectangular to prevent the lid 104 from rotating and changing orientation once received over the container body 102. Alternatively, the lid 104 may be rounded.

The container comprises a front surface 112, lower surface 114 opposite the upper surface 106, opposing side surfaces 116, 118 and a back surface 120. One or both of the front and back surfaces 112, 120 may comprise a label or decorative item indicative of, for example, the contents of the package. For example, the front surface 112 may include a label indicating the contents of the package while the back surface 120 may remain blank or may include instructions on product use, instructions for use, or any other information that is conventionally provided on a package for end-consumer reference.

The container 100 further comprises a protective cover 122 received thereover. The cover 122 is formed as a sleeve having a front surface 127, back surface 128, bottom surface 129 and an opening 124 in lieu of an upper surface, said opening 124 being configured to receive the container 102 therein with, for example, a friction fit. The opening 124 may be closed at a first end 126 and open at a second end 130. A lip 132 may extend along three sides of the cover 122 to seal front and back surfaces 134,136 of the cover to one another. The cover 122 further comprises an inner cavity 140 defined between an outer wall or layer 142 and an inner wall or layer 144. In one embodiment, the outer wall 142 is impermeable and at least a portion of the inner wall 144 is permeable. The outer and inner walls 142,144 are permanently attached to one another to seal the cavity 140 against the introduction or loss of materials therefrom (e.g., via heat sealing). In one embodiment, the cavity 140 may be open to a port 150 to permit the filling or removal of material from the cavity. The port 150 may be a one-way valve or two way valve. Although the port 150 is depicted as being positioned on an upper surface 146 of the cavity 140, any other position on the cover 122 may be used without deviating from the scope of the invention. The port 150 may be provided anywhere on the outer wall 142 or inner wall 144. Alternatively, the cavity 140 may be filled with said material prior to sealing of the lip 132.

Although the cover 122 is depicted as housing the entirety of the container body 102 therein, the cover 122 may alternatively be configured to house only a portion of the container body 102 therein. Further, the cover 122 may be open at both upper and lower ends to permit the cover 122 to be positioned at only a desired axial portion of the container body 102 (e.g., a portion having a known point of failure, etc.).

In one embodiment, the cavity 140 may be provided with a predetermined quantity of filling material 148 through said port 150. Said filling material 148 may itself serve to provide a cushion extending about the container and absorb external forces applied to the container. The filling material 148 in one embodiment may be a super-absorbent material. A permeable region 160, as depicted in phantom in FIG. 1B, may be provided on one or more regions of the inner wall 144. Said permeable region 160 permits the flow of fluids from the opening 124 into the cavity 140. The permeable region 160 may be formed as a region formed of a permeable material, such as silk, polyester, textile, sponge, paper and/or cardboard or a non-permeable material having one or more perforations extending through the inner wall 144. The permeable region 160 may be provided to overlie one or more of the front surface 112, back surface 120, side surfaces 116,118 and bottom surface 114 of the container 102. During use, any leakage of fluids from the container body 102 or an external source is directed toward the permeable region 160. The fluid then enters the permeable region 160 and flows into the cavity 140 housing the absorbent filling material 148. The fluid is retained within the absorbent filling material 148 in cavity 140 to minimize or mitigate the damage to other products. In another embodiment, one or more permeable regions 160 may be positioned at known points of failure or leakage of the container body 102, including, but not limited to: adjacent the lid 104, adjacent edges of the container body 102 and adjacent corners of container body 102. In yet another embodiment, the entirety of the inner wall 142 of the cover 122 may be formed of a permeable material open to the filling material 148.

In an embodiment where the cover 122 is filled with air or another gas, the permeable region 160 may be formed as an attachment secured to an inner wall of the cover 122, said attachment comprising an absorbent material therein, wherein said attachment is not open to the filling material in the cover 122. The attachment may be positioned anywhere on the inner wall 142. For example, the attachment may be placed on a lower end of the opening, adjacent to the container lower surface 114.

The embodiment of FIGS. 1A-1B, when filled with the absorbent filling material serves a dual purpose in that the filling material serves as a protective cushion for the container body 102 while also providing a means for retention of any fluids that may inadvertently leak from the container 102 or from another external source. Further, if a leakage occurs, the absorbent filling material 148 expands to provide added protection to the container body 102.

The cover 122 may be secured to the container body 102 via a friction fit. Alternatively, one or both of the container body 102 and cover 122 may include an adhesive or mechanical locking means to secure the container body 102 in the position depicted in FIG. 1A. The cover 122 is further adapted to receive a shipping label (not shown) thereon. Any portion of the cover 122 may be provided with a surface treatment (e.g., a high gloss finish) that permits the shipping label to be removed therefrom by an end recipient without tearing, damaging or otherwise inhibiting access to the instruction label. Alternatively, the instruction label may not be obstructed by the shipping label. In yet another embodiment, the instruction label may be included in a separate booklet (not shown) shipped with the container 100. Alternatively, the shipping label may be a dual layer sticker wherein a first clear layer (not shown) is permanently attached to the cover 122 by a permanent or semi-permanent adhesive and a second removable layer is provided thereover, the second removable layer including shipping information including, but not limited to, sender details, recipient details, order number, QR code, etc.

The cover 122 may be configured to receive one container body 102 therein and remain open at second end 130. Alternatively, any plurality of container bodies may be received within a single cover 122, as depicted in FIG. 1C. The covers 122 may be provided over each container body 102 in a manufacturing step or post-manufacturing step and individually loaded in a shipping container 170. The plurality of containers 100 may be attached to one another (e.g., via adhesive or another attachment mechanism) or may be held in place within the shipping container 170 via a friction fit. Alternatively, the cover of FIG. 1C may be formed as a unitary insert 180 having a plurality of openings 182 therein, each opening 182 sized to receive a container body 102 therein. The insert 180 is formed in the same manner as the individual cover 122 but is sized to be received in a shipping container 170 for ease of transport of multiple items.

In a manufacturing step, the cover 122 may be provided over the container body 102 in an un-expanded configuration. The assembled containers 100 may then be loaded in a shipping container 170 and caused to expand within said shipping container 170 (e.g., by filling said insert with gas, air, foam, absorbent material, expandable materials such as foams, etc.). In an embodiment where a unitary insert 180 is used, the insert 180 may be placed into a shipping container 170, followed by container bodies 102. The insert 180 may then be expanded within the box using any of an expanding foam, air or other gas, foam, expandable material, or other material described herein or known in the art.

In an alternative to the absorbent filling 148 of FIGS. 1A-1C, the cavity 140 may be filled with an active expanding foam or gas which is expandable (e.g., when subjected to a force exceeding a predetermined minimum force, when mixed with a catalyst, etc.). When activated, the expanding foam or gas expands and contours to the shape of the container body 102. If a foam is used, the foam may cure to the shape of the container body 102 and serve to insulate the container body 102 against damage. For example, applying a force exceeding a predetermined force to the container 100 may open the port 150, which may be a one-way port, thus allowing a fluid (e.g., fluid housed in the container body, etc.) or gas (e.g., air) to enter the cavity 140, said fluid or gas causing a chemical reaction with one or more materials located in the cavity to cause expansion thereof. The cover 122 may further comprise an optional vent (not shown) provided to permit excess air to exit therefrom (e.g., to prevent overfilling of the cover, etc.) or to allow air to flow thereinto.

The cover 122 may be formed of an expandable material configured to be expandable when the filling material is added thereinto or caused to expand therewithin. Alternatively, the cover 122 may be formed of a non-expandable material and may have some slack therein to allow for filling thereof. In one embodiment, an outer profile of the container 100 when expanded may be 0-40% greater than an outer profile of the container 100 prior to expansion. The outer profile in the expanded configuration may be larger in one or more of a length, width and height of the container 100.

In an alternative embodiment, the cover 122 may be expandable along an inner wall 144. Specifically, the inner wall 144 may be formed of an expandable material or any other material formed with a slack such that filling and/or expansion of the contents of the cavity 140 causes the inner wall 144 to expand and reduce the volume of the opening 128. This expansion causes the inner wall 144 to conform to the shape of the container body 102 and grip the container body 102 with a friction fit. The outer wall 142 may be non-expandable so that an outer profile remains unchanged through any phase of filling or expansion or, in another embodiment, the outer wall 142 may also be expandable. The cover 122 may be provided with slack such that outer and inner walls 144, 142 expand by an equal or substantially equal distance outwardly and inwardly. Alternatively, the cover 122 may be configured so that the inner wall 144 undergoes a greater quantity of expansion than the outer wall 142. An inner profile of the cover 122, defined by the walls of the inner wall 144 or the opening 128, may thus be movable from a first configuration having a first inner profile to a second configuration having a second inner profile, wherein the second inner profile is smaller than the first inner profile.

FIGS. 2A-2C depict a container 200 according to another embodiment of the invention. The container 200 is formed substantially similar to the container 100 except as described below. Whereas the cover 122 of FIGS. 1A-1B is formed as a sleeve having front surface 127, back surface 128, bottom surface 129, cover 222 of FIGS. 2A-2C is formed as an envelope having only a front surface 227 and a back surface 228 joined to one another at a lip 232. The lip 232 is formed substantially similarly as the lip 132. One or both of the front and back surfaces 227,228 may be formed with an enlarged surface area configured to conform to the size of a container body 202 received therein. Specifically, a length $L_1$ of the front surface at a portion of the sleeve 222 housing the container body 202 may be greater than a length $L_2$ at the lower lip 132. The dimensions of the cover 222 may be modified as needed to conform to the dimensions of a container body 202 being received therein.

As depicted in FIG. 2C, shipping container 170 may receive a plurality of the covers 222 therein. Alternatively, the covers 222 may be formed as one integral insert similar to insert 180.

The covers 122,222 of FIGS. 1A-1B and 2A-2C are at least partially compressible in one or more directions when subjected to external load to absorb at least a portion of an external force applied thereto. The combination of materials, shape and size of the covers 122,222 has been selected to permit the containers 100, 200 to deform under external forces which would otherwise result in a fracture or breakage of the container. This configuration has also been selected to strengthen the container 100,200 while avoiding the addition of any unnecessary bulk to the container, which would result in increased manufacturing and shipping costs. The result is a container 100,200 which exhibits substantially increased resistance to deformation, fracture and/or leakage when compared to prior art containers while minimizing production and shipping costs. Through extensive testing, it has been found that the container 100,200 is capable of withstanding forces applied during shipping (e.g., from a warehouse, to a shipping carrier and ultimately to delivery address such as a home or business] and obviates the need for packaging within an additional shipping box. Further, the containers 100,200 offer the added advantage that they are capable of being shipped on their own without the use of any secondary packaging.

The containers described herein may be used for the storage of any of a variety of liquid, gel, solid or semi-solid products such as toothpaste, oral care solutions, home cleaning products, soaps, fabric softeners, deodorants, lip treatments, etc. as well as for non-liquid products.

The embodiments described herein may be modified to add or replace features of one embodiment with another. For example, any of the embodiments described herein can be modified to be integrally formed onto a container body or be removably attached thereto. Further, any of the protective features described herein may be combined into a container body to provide added protection. Any combination and modification of the components described herein is envisioned within the scope of the invention.

What is claimed is:

1. A container comprising:
    a container body having a first cavity for receiving a product therein, the container body having a front surface, back surface, first sidewall and second sidewall; and
    a cover having an opening extending thereinto, said opening configured to receive said container body therein, the cover comprising an outer wall, an inner wall and a second cavity defined between said outer wall and inner wall, said second cavity housing a protective material therein, a fluid-permeable region provided on the inner wall, wherein the fluid-permeable region comprises a perforation,
    wherein said protective material moves the cover from a first configuration to a second configuration, wherein the first configuration corresponds to a first inner profile defined by the inner wall and the second configuration corresponds to a second inner profile defined by the inner wall, said second inner profile being smaller than said first inner profile.

2. The container of claim 1, wherein said first configuration corresponds to a first outer profile of the cover and the second configuration corresponds to a second outer profile of the cover, said second outer profile being larger than the first outer profile.

3. The container of claim 1, further comprising a port permitting filling of the second cavity with the protective material.

4. The container of claim 1, wherein the protective material is an expandable foam or gas.

5. The container of claim 1, further comprising a one-way valve configured to permit a flow of a gas into the second cavity, said gas reacting with said protective material to move the protective material from the first configuration to the second configuration.

6. The container of claim 1, wherein the fluid-permeable region is formed from a porous material.

7. The container of claim 1, wherein the protective material is absorbent.

8. The container of claim 1, wherein the container body is locked to said cover via one or more of an adhesive, welding, tongue and groove mechanism, snap-fit, friction-fit, keyed fit, and a flap extending from the cover and over an upper surface of the container body.

9. The container of claim 1, further comprises a lip extending around at least a portion of a perimeter of the cover, wherein a width of the cover at a first height is greater than a width of the cover at a second height located at the lip.

10. A container comprising:
   a cover having an opening extending thereinto, said opening configured to receive a container body therein, the cover comprising an outer wall, an inner wall and a cavity defined between said outer wall and inner wall, said cavity housing an absorbent material therein; and
   a fluid-permeable region provided on the inner wall of the cover, said fluid-permeable region being open to the cavity, wherein the fluid-permeable region comprises a perforation.

11. The container of claim 10, further comprising a port permitting filling of the cavity with the absorbent material.

12. The container of claim 10, wherein the fluid-permeable region is formed from a porous material.

13. The container of claim 10, wherein the container body is locked to said cover.

14. The container of claim 10, further comprises a lip extending around at least a portion of a perimeter of the cover, wherein a width of the cover at a first height is greater than a width of the cover at a second height located at the lip.

15. An insert for a shipping container, comprising:
   an insert body having an opening extending thereinto, said opening configured to receive a container body therein, the insert body comprising an outer wall, an inner wall and a cavity defined between said outer wall and inner wall, said cavity housing an absorbent protective material therein, wherein said protective material is movable from a first configuration defining a first outer profile of the insert body and a second configuration defining a second outer profile of the insert body, said second outer profile being larger than the first outer profile; and
   a fluid-permeable region provided on the inner wall of the insert body, said fluid-permeable region being open to the protective material.

16. The insert of claim 15, wherein the protective material is expandable.

* * * * *